United States Patent
Gegout et al.

(10) Patent No.: US 7,634,169 B2
(45) Date of Patent: Dec. 15, 2009

(54) METHOD TO REPRODUCE A MULTIMEDIA DATA FLOW ON A CLIENT TERMINAL, CORRESPONDING DEVICE, SYSTEM AND SIGNAL

(75) Inventors: Cédric Gegout, Rennes (FR); Michaël Picaud, Rennes (FR)

(73) Assignee: France Telecom, Paris (FR)

( * ) Notice: Subject to any disclaimer, the term of this patent is extended or adjusted under 35 U.S.C. 154(b) by 1262 days.

(21) Appl. No.: 10/614,471

(22) Filed: Jul. 7, 2003

(65) Prior Publication Data
US 2005/0086684 A1 Apr. 21, 2005

(30) Foreign Application Priority Data
Jul. 8, 2002 (FR) .................................. 02 08587

(51) Int. Cl.
*H04N 5/91* (2006.01)
(52) U.S. Cl. ........................................................ 386/46
(58) Field of Classification Search ................... 386/46, 386/52, 90
See application file for complete search history.

(56) References Cited

U.S. PATENT DOCUMENTS

| | | | |
|---|---|---|---|
| 6,262,776 B1 | 7/2001 | Griffits | |
| 6,539,054 B1 * | 3/2003 | Matsui et al. .......... | 375/240.08 |
| 2001/0000962 A1 | 5/2001 | Rajan | |
| 2006/0093315 A1 * | 5/2006 | Kelly et al. .................... | 386/52 |

FOREIGN PATENT DOCUMENTS

| | | |
|---|---|---|
| EP | 0 919 953 | 6/1999 |
| EP | 1 133 189 | 9/2001 |

OTHER PUBLICATIONS

Shigeru Fukunaga, Yuichiro Nakaya, Se Hoon Son, and Takefumi Nagumo, "MPEG-4 Video Verification Model version 16.0", XP-000861688, International Organisation for Standardization—Organisation Internationale de Normalisation, vol. N3312, pp. 1-380, Mar. 2000.
Takanori Senoh and Takuyo Kogure, "Multimedia Technology Trend in MPEG4", XP-000834530, IEICE Transactions on Electronics, Institute of Electronics Information and Comm. Eng., IEICE Trans. Electron., vol. E81-C, No. 5, pp. 642-649, May 1998.
Ramaswamy, "A Standard Target Decoder Model for MPEG-4 Flexmux Streams", 1999.

* cited by examiner

*Primary Examiner*—Thai Tran
*Assistant Examiner*—Mishawn Dunn
(74) *Attorney, Agent, or Firm*—Kinney & Lange, P.A.

(57) ABSTRACT

The invention relates to a method to reproduce, on at least one client terminal, at least one data flow comprising a plurality of encoded entities, each associated with at least one composition time stamp, said method comprising steps of decoding said flow(s), so as to obtain at least one decoded flow comprising a plurality of decoded entities, and composing of said decoded entities, at the times defined by said composition time stamps. According to the invention, for at least one of said encoded entities, said decoding step is anticipated with respect to said composition time stamp, if a composition context associated with said encoded entity is identical to a current composition context.

15 Claims, 4 Drawing Sheets

METHOD TO REPRODUCE A MULTIMEDIA DATA FLOW ON A CLIENT TERMINAL, CORRESPONDING DEVICE, SYSTEM AND SIGNAL

The field of the invention is that of the reproduction on a client terminal of a multimedia flow, for example representing a two or three-dimensional animated graphic scene, an audio or video signal, etc. More specifically, the invention relates to a method to decode such a flow, with a view to its reproduction on the terminal.

Such multimedia flows are generally arranged in the form of a series of encoded autonomous units referenced by a single time stamp, the purpose of which is to inform the receiving terminal of the time at which the interpretation and reproduction of the signal received should take place. The term interpretation of an autonomous unit generally refers to the calculation of the structure to be reproduced from, firstly, information contained in said autonomous unit and, secondly, information held by the reproduction device. The term reproduction conventionally refers to the display, visual, audio or sensory presentation to the user. In addition, the reproduction of the multimedia signal by the terminal requires the decoding of autonomous units received from a server or a transmitting terminal in encoded form.

The Systems part of the MPEG-4 ("Moving Picture Coding Experts Group") standard (ISO-IEC/14496-1) defines a decoding model, based on the time stamping of encoded frames. The decoding and reproduction sequence used according to this standard is illustrated in FIG. 1: it briefly presents the operation of the software modules of a viewing or reproduction tool, used to decode the multimedia flow, and then assemble the signal decoded in this way.

On receipt, the different multimedia flows are stored in a decoding buffer memory 1, and the different encoded entities (referred to as EE) constituting said flows are supplied to a decoder 2, which delivers decoded entities (referred to as ED). Said decoded entities are stored in a composition memory 3, and then reproduced on the client terminal by the module in charge of composition or assembly, referred to as the assembler 4.

Therefore, the processing used by the client terminal on receipt of a multimedia flow essentially comprises two phases, a first phase consisting of decoding the encoded entities EE and a second phase consisting of composing the decoded entities ED.

The time stamp associated with each of the autonomous flow entities, referred to as the Composition Time Stamp in the standard MPEG-4 and Presentation Time Stamp in the standard MPEG-2, hereafter generally referred to as the composition stamp, or ETC (or in English CTS for "Composition Time Stamp"), specifies the time at which the data of the flow is to be reproduced (in visual, audio format, etc.) by the terminal for the user.

In the majority of known techniques, the decoding and assembly of the frames are implemented at the time indicated by the ETC, such that it is artificially considered that the EE decoding time is null. However, for complex flows, in particular, the decoding time is not always negligible, and the decoded entity ED is not always available sufficiently early for the assembler 4 to reproduce it at the time defined by its ETC. Therefore, the reproduction process is delayed.

Indeed, when the multimedia flows in question are complex, or particularly large, flows, the decoding thereof may prove to be complex, and particularly long to implement.

In this way, a desynchronisation of the reproduction of the different frames is observed, resulting for example in a scrambled display of the graphic scene in the case of video flows. When different decoding sequences are used in parallel, to ensure for example the simultaneous reproduction of a signal representing an animated graphic scene, and an audio signal, the delay in the decoding of the graphic scene may induce sound and image desynchronisation.

This is, of course, not acceptable and may prove to be particularly unpleasant for the user.

According to some specific techniques, a specific time stamp, referred to as a decoding time stamp, or ETD (or in English DTS for "decoding Time Stamp"), is sometimes associated with the flow entities, to specify at which time the decoder 2 is to decompress the encoded frame EE or indicate that the order of decoding of the EE is different to the order of composition or assembly indicated for that of the increasing ETC.

However, again, this technique is not very suitable for the processing of complex flows, for which the interpretation phase is long and costly, and therefore delays the frame reproduction time with respect to the ETC, which induce desynchronisation of the reproduction of the different frames.

To increase the fluidity of the reproduction, and make optimum use of the viewing, or more generally reproduction, tool resources, it has been envisaged, according to some known techniques, particularly for the reproduction of scene description flows such as MPEG-4/BIFS or new video flows such as MPEG-4 Visual (ISO-IEC/14496-2) or H26L (ISO-IEC/14496-10), to decorrelate the decoding phase from the signal reproduction phase in terms of time. In this case, the decoding functions in asynchronous mode with respect to the signal reproduction, in order to make maximum use of the calculation and memory resources available on the terminal. The composition terminal must in turn function in synchronous mode with respect to the signal reproduction and, due to its speed of execution, depends on the signal reproduction fluidity.

However, even though the most advanced decoding and reproduction techniques try to make maximum use of this approach in order to render reproduction as fluid as possible, they remain restricted to standard flow processing and prove to be relatively ineffective with the advent of more complex flows.

The inventors of the present patent application analysed these different known techniques and identified the following problem: in order to simplify the layout of audio or video decoders as much as possible, these different techniques generally consider that the decoding and composition or assembly procedures are relatively independent and that the decoded entity ED is sufficient in itself for its composition. The assembler 4 then depends closely on the operating system on which the reproduction tool (or "player") is installed and not on the specificity of the encoding.

However, according to the inventors of the present patent application, this approach is not sufficient anymore when complex flows are processed, such as BIFS scene description flows (this format is particularly presented in "the MPEG-4 Systems Verification Model", ISO/IEC JTCI/SC29/WG 11-N1693, MPEG 97, April 1997), MPEG-7 metadata or new types of video flows such as H26L (ISO-IEC/14496-10).

The invention particularly aims to remedy the various drawbacks of the prior art mentioned above, particularly in light of the problem identified by the inventors.

More specifically, an aim of the invention is to provide a technique to reproduce a multimedia flow or a plurality of multimedia flows, which ensures a fluid reproduction, irrespective of the complexity of the flow(s) in question.

Another aim of the invention is to implement such a reproduction technique, based on optimised decoding of the signals received.

The invention also aims to provide such a reproduction technique which enables optimum use of reproduction terminal memory and calculation resources.

The invention also aims to implement such a reproduction technique which is compatible with decoding techniques according to the prior art.

A further aim of the invention is to propose such a reproduction technique which does not induce a significant additional cost in terms of resources, particularly memory resources, compared to reproduction techniques according to the prior art.

These aims, along with those emerging hereafter, are achieved using a method to reproduce, on at least one client terminal, at least one data flow comprising a plurality of encoded entities, each associated with at least one composition time stamp, said method comprising steps consisting of:
    decoding said flow(s), so as to obtain at least one decoded flow comprising a plurality of decoded entities;
    compositing said decoded entities, at the times defined by said assembly time stamps.

According to the invention, for at least one of said encoded entities, said decoding step is anticipated with respect to said composition time stamp, if a composition context associated with said encoded entity verifies at least one predetermined criterion.

In this way, the invention is based on a completely new and inventive approach to multimedia flow reproduction, which is particularly suitable for the processing of complex flows, such as scene description flows such as MPEG-4/BIFS or new video flows such as MPEG-4 Visual (ISO-IEC/14496-2) or H26L (ISO-IEC/14496-10).

Indeed, the invention proposes to anticipate the decoding of the signals received, with respect to the composition time stamp, accounting for the composition context, which has never been envisaged in the techniques according to the prior art.

Therefore, in this case, the term decoding refers to the actual decoding phase, but also any pre-interpretation phase, enabling the at least partial calculation of the structure to be reproduced associated with the decoded entity.

In this way, for all the entities decoded by anticipation, a fluid reproduction is guaranteed at the time specified by the composition stamp, and the risks of desynchronisation of the various frames to be reproduced are thus decreased significantly. In addition, the invention makes it possible to optimise the decoding resources of the reproduction devices: indeed, it makes it possible to make optimal use of the calculation resources of "multi-threaded" platforms (i.e. platforms enabling several software tasks to be run in parallel), which is essential when processing graphic signals for which fluidity constraints need to be met. Therefore, the invention makes it possible to optimise decoding, since the reproduction device, in parallel with the interpretation and reproduction of the decoded entities, anticipates the decoding of the encoded entities already received.

Since the anticipation of the decoding proposed by the invention is dependent on the composition context of the encoded entity in question, the problem identified by the inventors of the present application relating to the postulate of the independence of the multimedia flow decoding and composing phases, to date considered as essential in reproduction techniques of BIFS scene description signals, MPEG-7 metadata or new types of video flows such as H26L (ISO-IEC/14496-10), for example, is resolved.

Advantageously, such a reproduction method implements a step consisting of comparing a current composition context and said composition context associated with said encoded entity, and said decoding step is anticipated when said comparison is positive.

In this way, the decoding step is anticipated when the current composition context is identical to the composition context associated with the encoded entity in question. Indeed, a positive comparison specifies that the anticipated encoded entity decoding result may be used during the composition phase, subject to a possible modification of the current composition context before the implementation of said phase.

Advantageously, said entities decoded by anticipation are stored in memory by said client terminal until said composing step.

Preferentially, in the case of a negative comparison, said encoded entity is stored in memory in said client terminal, and said decoding step is implemented at said time defined by said associated composition time stamp.

In this way, if the current composition context differs from the composition context associated with the encoded entity, its decoding, which is conventionally performed during the composition phase of said entity, is not anticipated.

Preferentially, for at least some of said entities decoded by anticipation, said comparison step is repeated, prior to said composing step, and said composing step is implemented when said second comparison is positive.

In this way, it is verified that the current composition context has not changed since the anticipated decoding of the encoded entity, and that the result of said anticipated decoding may be used during the composing step. The composing step is only implemented, for the entity decoded by anticipation, if the current composition context is still identical to the composition context associated with the entity in question.

Preferentially, when said second comparison is negative, said method implements an error handling step.

Indeed, a negative comparison specifies that the current composition context has changed since the anticipated decoding of the encoded entity, and that the composition of the entity, decoded by anticipation, is impossible in view of said current context. The error management implemented in this case is of the conventional type and will therefore not be described in more detail in this document.

Advantageously, a decoding order data item is also associated with at least some of said encoded entities.

Indeed, it is possible that the order of decoding of the encoded entities is different to their order of assembly: this is particularly the case when some large or complex encoded entities require a longer decoding time. In this case, they are decoded prior to the less complex encoded entities, so as to ensure their availability in decoded form at the time specified by the composition time stamp.

In a preferred embodiment of the invention, said decoding order data item is a decoding time stamp.

Preferentially, said data flow belongs to the group comprising:
    video flows;
    description flows of a graphic scene with at least two dimensions;
    audio flows;
    description flows of an object with at least two dimensions;
    animation flows of at least one object;
    metadata description flows.

Preferentially, the format of said encoded entities belongs to the group comprising:
    MPEG media formats;

MPEG-7 data description formats;
BIFS scene description formats;
H26L formats.

The invention also relates to a device to reproduce at least one data flow comprising a plurality of encoded entities, each associated with at least one composition time stamp, said device comprising:
  means to decode said flow(s), making it possible to obtain at least one decoded flow comprising a plurality of decoded entities;
  means to compose said decoded entities, implemented at the times defined by said composition time stamps.

According to the invention, for at least one of said encoded entities, said decoding means are activated prior to said composition time stamp, if a composition context associated with said encoded entity verifies at least one predetermined criterion.

Advantageously, such a device also comprises:
  a decoding buffer memory, wherein said encoded entities are stored in increasing order of decoding;
  a composition buffer memory, wherein said decoded entities are stored in memory.

According to a first advantageous alternative embodiment of the invention, said decoded entities are stored in memory in said composition buffer memory in increasing composition time stamp order.

Therefore, during the composing step, the decoded entities are processed in the order wherein they are stored in the composition buffer memory, and these decoding means sort the decoded entities according to their composition time stamp, so as to order them in the composition buffer memory.

According to a second advantageous alternative embodiment of the invention, said decoded entities are stored in memory in said composition buffer memory in increasing order of decoding.

In this way, the decoding means arrange the entities in the composition buffer memory in the order wherein they were decoded, and the composing means sort the decoded entities, within the composition buffer memory, so as to process them in the increasing order of their composition time stamp.

The invention also relates to a system to transmit at least one data flow from a data server to at least one client terminal,
  said server comprising means to encode said data flow, in the form of a plurality of encoded entities, each associated with at least one composition time stamp,
  said client terminal comprising:
    means to decode said flow(s), making it possible to obtain at least one decoded flow comprising a plurality of decoded entities;
    means to compose said decoded entities, implemented at the times defined by said composition time stamps.

According to the invention, for at least one of said encoded entities, said decoding means are activated prior to said composition time stamp, if a composition context associated with said encoded entity verifies at least one predetermined criterion.

The invention also relates to a signal representing a data flow intended to be reproduced by at least one reproduction device as described above, said signal being available at the output of said decoding means and supplying said composing means of said device.

According to the invention, such a signal comprises a plurality of entities of said flow, each comprising:
  a composition time stamp;
  an isdecod marker, specifying whether said entity was decoded in an anticipated manner;
  and, when said isdecod marker takes a first value, said entity is in encoded form and, when said isdecod marker takes a second value, said entity is in decoded form and also comprises:
    data items, referred to as presStruct, relating to a reproduction structure of said entity;
    data items, referred to as decodInfo, relating to the decoding of said entity.

Other characteristics and advantages of the invention will be seen more clearly on reading the following description of a preferential embodiment, given simply as an illustrative and non-restrictive example, and the appended figures, wherein:

FIG. 1, already described above, shows a synoptic view of a multimedia flow processing sequence in a reproduction terminal;

Figure 3:
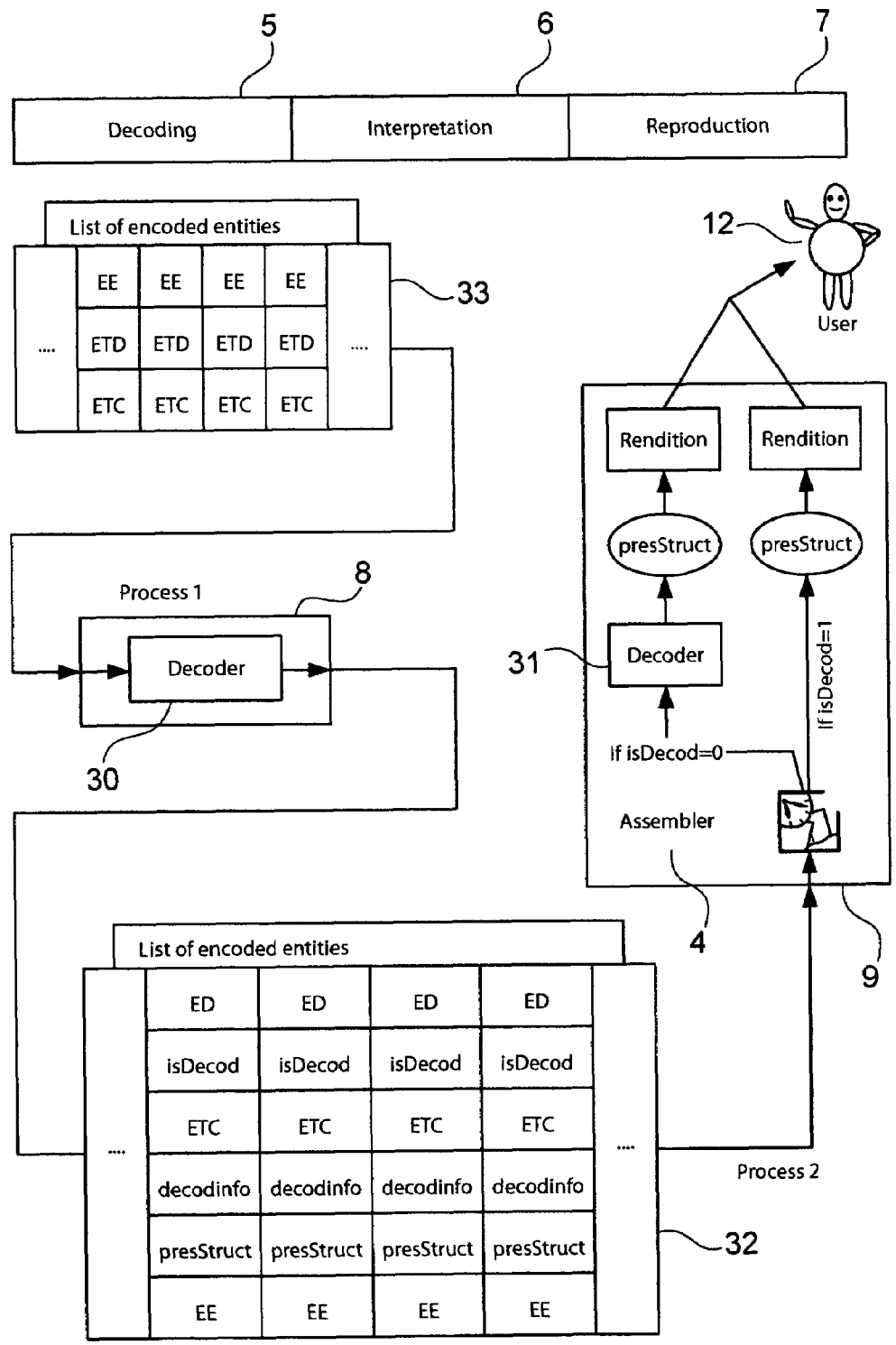
FIG. 3 shows a synoptic view of a reproduction device implementing anticipation of the decoding according to the invention.
Figure 4:
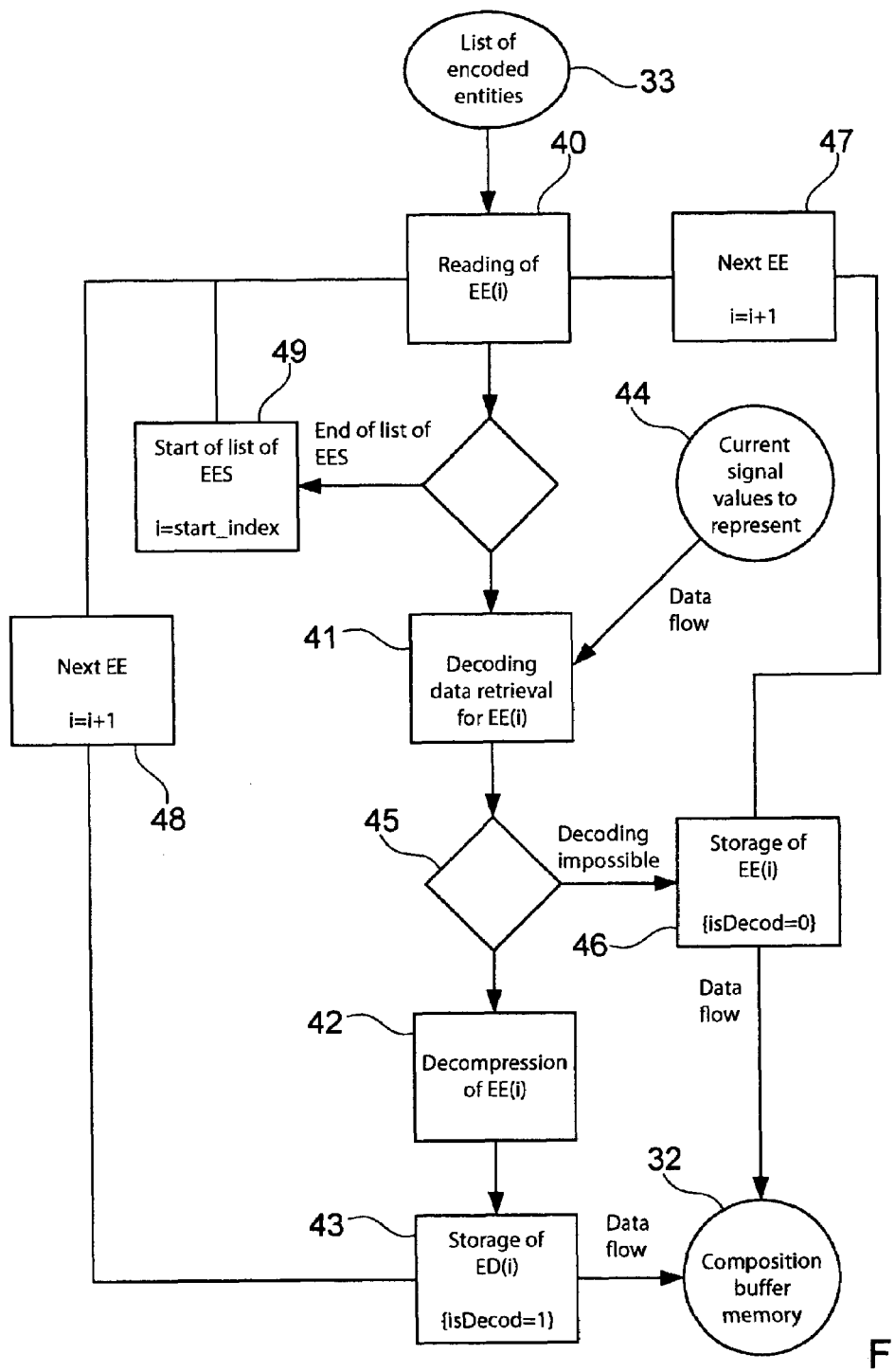
Figure 5:
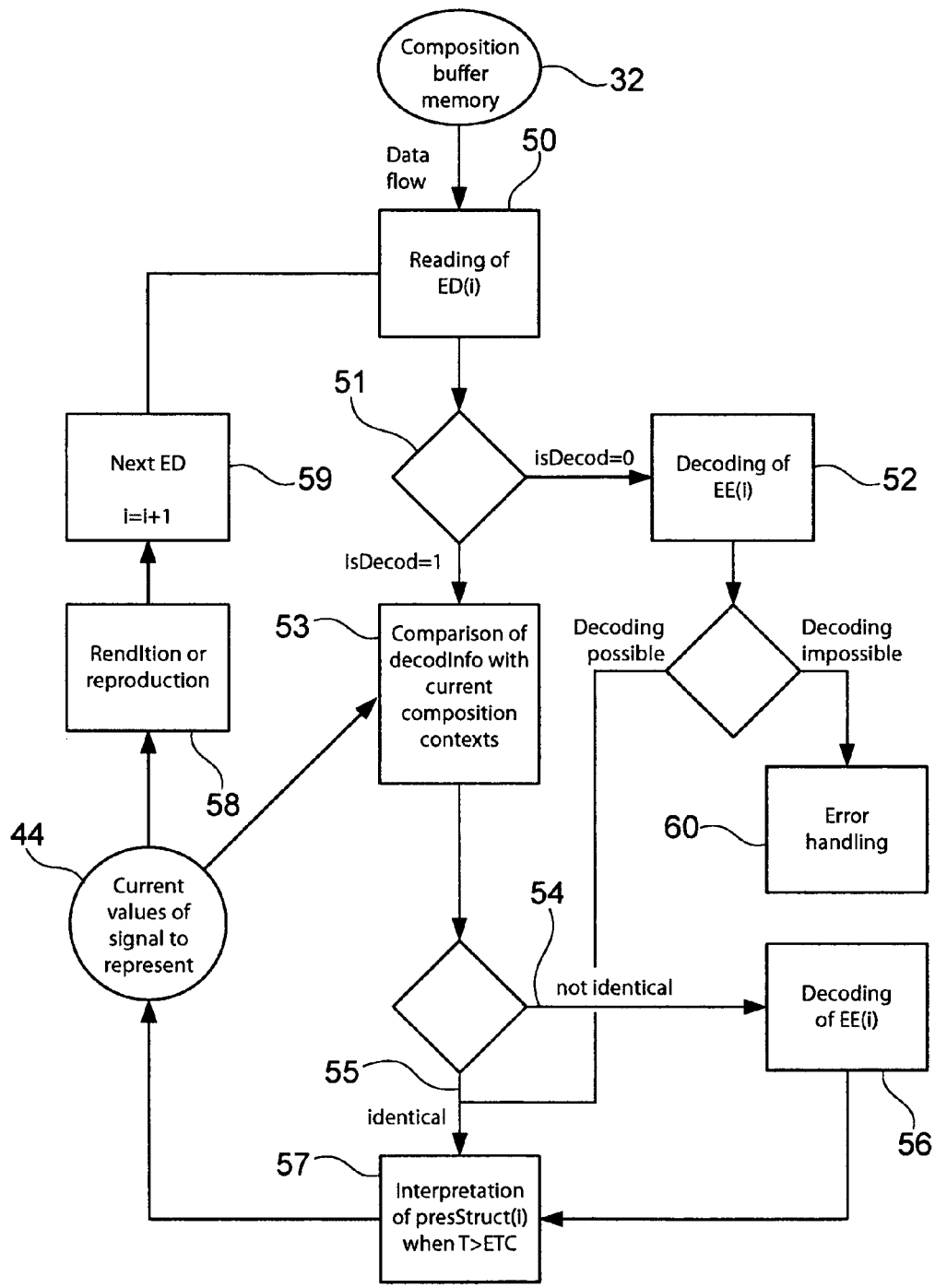

FIG. 4 details the decoding process implemented by the device in FIG. 3;

FIG. 5 describes the composition process implemented according to the invention by the device in FIG. 3.

The general principle of the invention is based on the anticipation of the decoding of some encoded entities in the multimedia flow, according to their associated composition context.

Figure 1:
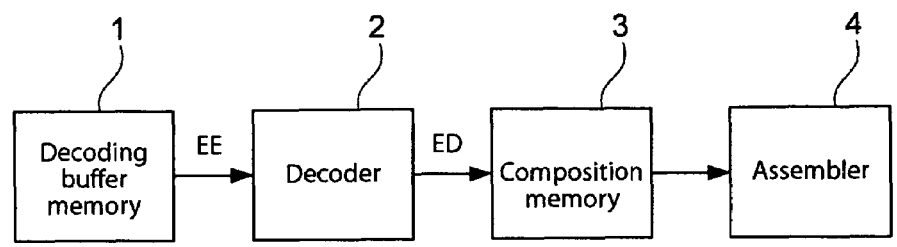
Figure 2:
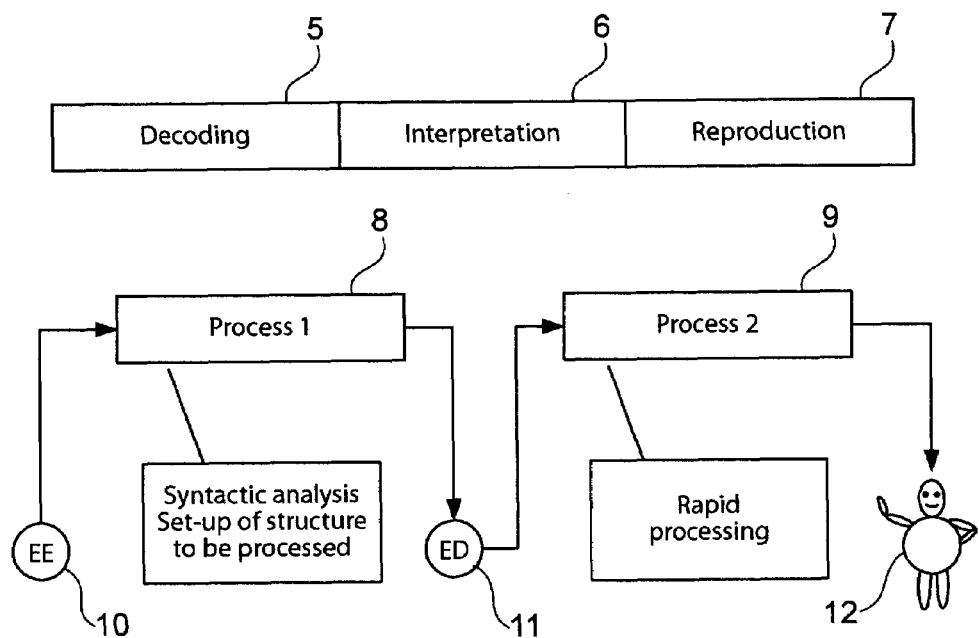
FIG. 2 illustrates schematically the different processing phases implemented according to the invention.

With reference to FIG. 2, an embodiment of the various processing phases of the invention is presented.

As mentioned above, an encoded entity EE 10 is received by a viewing or more generally rendition terminal, which must subject it to successive decoding 5, interpretation 6, reproduction 7 phases, so as to enable its display 12 on the screen, if said EE 10 is obtained from a video flow.

A first process referenced 8 comprises the decoding phases 5 and a pre-interpretation phase 6, which makes it possible, from EE 10, to produce a corresponding decoded entity 11, memorised by the viewing terminal until its reproduction 12. The purpose of this first process 8 is to generate an entity, associated with an composition time stamp ETC or CTS, which is easy to analyse syntactically, and which contains all the information required for the assembler 4 to reproduce the signal at the time t=ETC in this case, this entity is referred to as the decoded entity ED 11.

A second process referenced 9 comprises a post-interpretation phase of the decoded entity ED 11 and the reproduction phase 7 itself. The purpose of this second process 9 is to reproduce the decoded entity 11 as rapidly as possible, so as to observe the temporal reproduction constraints required by the frame ETC.

According to the invention, the first process referenced 8 is advantageously desynchronised with respect to the second process 9, so as to enable anticipation of the decoding with respect to the frame ETC, and thus guarantee rapid and fluid reproduction of the signal for the user.

Two alternative embodiments of the invention may particularly be envisaged and therefore will be studied successively hereafter.

According to a first alternative embodiment, the order of decoding of the encoded entities 10 is identical to the order of composition of the decoded entities 11, specified by the composition time stamp ETC.

According to a second alternative embodiment, the order of decoding of the encoded entities EE differs from the order specified by the ETC, for example if some more complex entities require a long decoding time and must therefore be decoded in priority. According to this second alternative embodiment, a data item specifying the decoding order must be associated with the encoded entities EE 10, for example in the form of a decoding time stamp ETD.

First of all, with reference to FIGS. 3 to 5, the first alternative embodiment is presented, wherein the order of decoding and the order of composition are identical.

In this case, the device according to the invention represented in FIG. 3 comprises two signal decoders 30, 31, respectively used by each of the processes referenced 8 and 9 in FIG. 2.

As specified above, the first process referenced 8 functions independently, in asynchronous mode, with respect to the second process referenced 9. The latter carries out the reproduction 7 of the signal received by the device and therefore operates in synchronous mode with respect to the signal time.

Both processes referenced 8 and 9 use the same buffer memory referenced 32, which contains all the decoded entities ED 11. Hereafter, said buffer memory 32 will be referred to as the composition buffer memory. The decoded entities are stored in the composition buffer memory in the increasing order of their composition time stamp ETC, which also corresponds to their order of decoding by the decoder 30.

The encoded entities EE 10 are received from the source transmitting the encoded signal (for example an audio or video flow server) and are stored in the increasing order of their ETC in a buffer memory referenced 33, referred to as the decoding buffer memory.

As shown schematically in the decoding buffer memory 33 in FIG. 3, each encoded entity EE 10 is associated with a composition time stamp ETC and, if applicable, in the second alternative embodiment which will be studied later in this document, with a decoding time stamp ETD.

Each decoded entity ED 11 stored in the composition buffer memory 32 is associated with the following data items;
 a composition time stamp ETC specifying to the device in FIG. 3 the time at which said entity ED 11 is to be reproduced 12 for the user;
 data items, referred to as decodInfo, which are not contained in EE 10, but which were necessary during the decoding thereof, enabling the creation of the decoded entity ED 11;
 a marker, referred to as isDecod, specifying whether anticipated decoding of the encoded entity EE 10 by the decoder 30 was carried out during the first process referenced 8;
 a structure, referred to as presStruct, which will be used by the second process referenced 9 to reproduce the decoded entity ED 11, if an anticipated decoding, specified by isDecod=1, was possible during the first process referenced 8. It should be noted that said presStruct structure depends, firstly, on decodInfo and, secondly, on data items contained in the encoded entity EE 10, according to a dependency function calculated by the decoder 30.

Finally, if anticipation of the decoding by the first process referenced 8 was not possible, i.e. if isDecod=0, the composition buffer memory 32 contains the entity in encoded form EE 10.

With reference to FIG. 4, the operating principle of the first process referenced 8, intended to anticipate the decoding to the encoded entities EE 10 already received, will now be presented in more detail.

According to said first process 8, the decoding buffer memory 33, containing the list of encoded entities EE 10 is scanned. A first encoded entity EE(i) is read 40, and the corresponding decoding data, decodInfo, is retrieved from the composition context 44. This composition context 44 corresponds to the current values of the signal to be represented: for example, in the case of graphic scene viewing, this composition context corresponds to the various objects present in the scene at the current time and to the hierarchical tree representing their arrangement.

During a step referenced 45, the composition context associated with the entity EE(i) is compared to the current composition context, so as to determine whether anticipated decoding of EE(i) by the decoder 30 is possible.

Taking a simple example of the reproduction of a scene description flow, comprising a car, the decoding of the frame EE(i) corresponding to the steering wheel inside said car, can only be anticipated according to the invention if, at the current decoding time, the composition context corresponding to the car is represented on the screen.

If the composition context differs from the composition context associated with EE(i), anticipated decoding by the decoder 30 is impossible, isDecod=0, and the encoded entity EE(i) is stored 46 in the composition buffer memory 32.

The process then goes 47 to the next encoded entity EE(i+1) in the list 33.

When the end of the list is reached, reading 40 systematically resumes at the start 49 of the list 33 of the EE.

In this way, for all the EE for which anticipated decoding is possible, said first process referenced 8 generates the data isDecod, preStruct, and fills a composition buffer memory 32 with the decoded entities ED 11 obtained. This process referenced 8 works in asynchronous mode, and it is assigned, in the reproduction device in FIG. 3, a low priority, so as not to use the calculation resources required by the device to ensure a fluid reproduction of the signal by the second process referenced 9.

Indeed, the definition of the stamps ETC requires the reproduction device to guarantee, at the time T, the reproduction by the second process 9, of all the decoded entities ED wherein the composition time stamp ETC is less than T. The second process 9 must therefore have sufficient calculation resources to make it possible to reproduce the decoded entities ED contained by the composition buffer memory 32 as rapidly as possible.

The operating mode of the second reproduction process 9 is now presented with reference to FIG. 5.

The composition buffer memory 32 is browsed so as to read 50 the different decoded entities ED(i) that it contains successively. During a first step referenced 51, the value of the isDecod marker is analysed, to determine whether anticipated decoding has been carried out by the decoder 30 of the first process referenced 8.

If isDecod=1, a comparison 53 of the decodInfo data stored in the composition buffer memory 32 is carried out with reference to the decoded entity ED(i), with the current composition context 44.

The manner wherein the current composition context data is retrieved, according to said second process 9, depends on the different possible configurations of the device, and corresponds to conventional techniques, well known to those skilled in the art, which will therefore not be described in more detail within the scope of the present invention.

If decodInfo differs 54 from the current composition context, it is necessary to repeat the decoding 56 of EE(i), as a function of the current composition context.

On the other hand, if decodInfo coincides 55 with the current composition context, the preStruct structure is therefore valid, and the decoded entity ED(i) may be reproduced at the time specified by the composition time stamp ETC. The structure preStruct(i) is interpreted 57, and ED(i) is reproduced 58, before the process 9 goes to the next ED 59 of the composition buffer memory 32.

If isDecod=0, the anticipation of the decoding of the entity in question was not possible, therefore, it is necessary to carry out the decoding 52 of the encoded entity EE(i). If this decoding is possible, due to a compliance between the current composition context associated with the EE in question, the interpretation 57 of the corresponding presStruct structure, and the reproduction 58 of the entity are then carried out. If the decoding is not possible, since the current composition context differs from the composition context associated with the EE in question, a conventional error handling procedure 60 is implemented. In the above example of a scene description flow representing a car, the decoding of the entity representing the steering wheel is impossible if the car is no longer part of the scene context, for example, due to an intervention of the user who has deleted it from the scene viewed.

According to this second process 9, the decoded entity ED 11 of the composition buffer memory 32 is then deleted, since, after reproduction, this entity is now obsolete.

The second alternative embodiment of the invention will now be presented briefly, in the case where the order of decoding of the encoded entities EE 10 differs from the order of composition specified by their associated composition time stamps ETC.

Therefore, the order wherein the EE are stored in the decoding buffer memory 33 differs from the order of reproduction of the decoded entities ED. The first process referenced 8, presented above with reference to the FIG. 4, then operates in the order of storage of the entities in the decoding buffer memory 33. In this way, if this order of decoding is specified by a decoding time stamp ETD associated with each of the entities of the flow, the indices i assigned to the entities EE(i) in FIG. 4 correspond to the increasing ETDs.

On the other hand, the reproduction of the entities by the second process referenced 9 requires the implementation of the following preliminary steps:

the entity comprising the lowest stamp ETC is identified in the composition buffer memory 32;

when the time T is greater than the lowest composition time stamp $ETC_{min}$ identified, the reproduction of the presStruct structure of the decoded entity ED associated with said stamp $ETC_{min}$ is carried out and the corresponding decoding entity Ed is deleted from the composition buffer memory 32.

It should be noted that, according to a first alternative sub-embodiment, the decoded entities ED are stored in the composition buffer memory in the order of decoding, and it is the role of the reproduction function of the second process 9 to select the entity ED with the lowest stamp $ETC_{min}$.

According to another alternative sub-embodiment, the entities ED are stored in the composition buffer memory 32 in the order of the increasing time stamps ETC. In this case, the reproduction function of the second process 9 remains identical to that presented above with reference to FIG. 5; on the other hand, the decoding function of the second process 9 must browse the composition buffer memory 32 in the order of decoding specified by the increasing decoding time stamps ETD.

The following successive steps are implemented the entity of the value isDecod=0 comprising the lowest decoding time stamp $ETD_{min}$ is identified in the composition buffer memory 32;

the encoded entity EE corresponding to said time stamp $ETC_{min}$ identified is then decoded;

the encoded entities EE are then decoded successively, in the order of the decoding time stamps ETD, until all the entities have a value isDecod=1.

The time spent by the second process 9 decoding the encoded entities EE is thus reduced significantly, since the maximum possible encoded entities EE have already been decoded by the decoder 30 of the first process 8, which makes it possible to ensure excellent signal reproduction fluidity.

Examples of decodInfo and presStruct data items which may be used within the scope of the present invention are now presented briefly, for MPEG-4/BIFS flow decoding.

In the case of BIFS type flow decoding, the decoding time stamp ETD is equal to the composition time stamp ETC for all the Encoded Entities EE; therefore, the first alternative embodiment of the invention described above, wherein the order of decoding is that of reproduction, is applicable.

The embodiment according to the invention may be rendered specific by specifying, in this case, the values of decodInfo and presStruct and specifying how decodInfo is obtained.

Depending on the nature of the Encoded Entity, different values are obtained:

If the Encoded Entity is a BIFS node insertion command (as defined in section 9.3.6.5 ISO/IEC 14496-1:2000 (E)), then:

decodInfo is the identification value of the node and of the decoding table corresponding to said node, i.e. {nodeID, GetNDTFromID(nodeID)};

presStruct is an easily interpretable object which describes the command as it is defined in the structure described in section 9.3.6.5.1 of the MPEG-4/System standard.

If the EE is an IndexedValueInsertion command, then:

decodInfo is the node identification value, that of the node field identification, the value of the node and value of the field corresponding to said node, i.e. {nodeID, inID, node=GetNodeFromID(nodeID),field=node.field [node.in2all [inID]]};

presStruct is an easily interpretable object which describes the command as it is defined in the structure described in section 9.3.6.6.1 of the MPEG-4/System standard.

If the EE is an IndexedValueDeletion command, then:

decodinfo is {nodeID, inID, node=GetNodeFromID(nodeID),field=node.field[node.in2all [inID]]};

presStruct is an easily interpretable object which describes the command as it is defined in the structure and is a simple indication of deletion of a value at the deletionPosition position obtained during the decoding of the EE.

If the EE is a FieldReplacement command (described in section 9.3.6.14 of the standard), then;

decodInfo is {nodeID, inID, node=GetNodeFromID(nodeID),field=node.field[node.in2all [inID]]};

presStruct is an easily interpretable object which describes the command as it is defined in the structure described in section 9.3.6.14.1 of the standard.

If the EE is an IndexedValueReplacement command, then:

decodInfo is {nodeID, inID, node=GetNodeFromID(nodeID),field=node.field[node.in2all [inID]]};

presStruct is an easily interpretable object which describes the command as it is defined in the replaceposition position and the structure described in section 9.3.6.14.1 of the standard.

If the EE is a SceneReplace command, then decodInfo is blank { } presStruct is an easily interpretable object which describes the command as it is defined in the structure described in section 9.3.7.1.1 of the standard.

In all other cases, the encoded entity EE is not decoded by anticipation.

Since these examples of Encoded Entities require significant decoding and interpretation resources, they particularly benefit from the advantages of the invention.

Therefore, the invention makes it possible to optimise the decoding of the flow received, and offers numerous advantages.

First of all, the invention makes it possible to optimise the decoding process without introducing significant additional memory requirements with respect to the prior art. Indeed, according to the invention, only two decoding processes need to be run in parallel. One of the processes is synchronous with the clock used to reproduce the signal, the other (so-called anticipation) process operates in asynchronous mode. The above-mentioned memory increment according to the invention with respect to the prior art is less than the size of a single decoding process since both processes share the same buffer memories.

In addition, the technique according to the invention can only induce superfluous additional decoding if the anticipation of the decoding induces a decoding error. This decoding error may be easily controlled, since decoder of the synchronous process simply needs to compare the initial decoding settings with those of the decoder carrying out the anticipation.

The technique according to the invention also makes it possible to make optimal use of the calculation resources of "multi-threaded" platforms (i.e. platforms enabling several software tasks to be run in parallel). This is essential when processing graphic signals for which fluidity constraints need to be met.

Finally, the technique according to the invention is perfectly compatible with conventional decoding techniques. Indeed, using an additional decoder, which anticipates the decoding, ensures great operating scenario flexibility and compatibility of conventional signal decoding known in the prior art.

The invention claimed is:

1. Method to reproduce, on at least one client terminal, at least one data flow comprising a plurality of encoded entities, each associated with at least one composition time stamp, said method comprising steps comprising:
    decoding said encoded entities, so as to obtain a plurality of decoded entities;
    composing said decoded entities, at the times defined by said composition time stamps,
    wherein for at least one of said encoded entities, said method implements a step comprising comparing a current composition context and a composition context associated with said encoded entity, and wherein said decoding step is anticipated with respect to said composition time stamp when said comparison is positive, indicating that the composition context associated with said encoded entity is identical to the current composition context.

2. Reproduction method according claim 1, characterised in that said entities decoded by anticipation are stored in memory by said client terminal until said composition step.

3. Reproduction method according to claim 1, characterised in that, in the case of a negative comparison between said composition context associated with said encoded entity and said current composition context, said encoded entity is stored in memory in said client terminal, and said decoding step is implemented at said time defined by said associated composition time stamp.

4. Reproduction method according to claim 1, characterised in that, for at least some of said entities decoded by anticipation, comparison between said composition context associated with said encoded entity and said current composition context is repeated, prior to said composition step, and said composition step is implemented when a repeated comparison is positive.

5. Reproduction method according to claim 4, characterised in that, when a repeated comparison is negative, said method implements an error handling step.

6. Reproduction method according to claim 1, characterised in that a decoding order data item is also associated with at least some of said encoded entities.

7. Reproduction method according to claim 6, characterised in that said decoding order data item is a decoding time stamp.

8. Reproduction method according to claim 1, characterised in that said at least one data flow belongs to the group consisting of:
    video flows;
    description flows of a graphic scene with at least two dimensions;
    audio flows;
    description flows of an object with at least two dimensions;
    animation flows of at least one object; and
    metadata description flows.

9. Reproduction method according to claim 1, characterised in that the format of said encoded entities belongs to the group consisting of:
    MPEG media formats;
    MPEG-7 data description formats;
    BIFS scene description formats; and
    H26L formats.

10. Device to reproduce at least one data flow comprising a plurality of encoded entities, each associated with at least one composition time stamp, said device comprising:
    means to decode said encoded entities, making it possible to obtain a plurality of decoded entities; and
    means to compose said decoded entities, implemented at the times defined by said composition time stamps,
    wherein, for at least one of said encoded entities, said decoding means are activated prior to said composition time stamp, if a comparison between a current composition context and a composition context associated with said encoded entity is positive, indicating that the composition context associated with said encoded entity is identical to the current composition context.

11. Reproduction device according to claim 10, characterised in that it also comprises:
    a decoding buffer memory, wherein said encoded entities are stored in increasing order of decoding;
    a composition buffer memory, wherein said decoded entities are stored in memory.

12. Device according to claim 11, characterised in that said decoded entities are stored in memory in said composition buffer memory in increasing composition time stamp order.

13. Device according to claim 11, characterised in that said decoded entities are stored in memory in said composition buffer memory in increasing order of decoding.

14. System to transmit at least one data flow from a data server to at least one client terminal,
    said server comprising means to encode said data flow, in the form of a plurality of encoded entities, each associated with at least one composition time stamp,
    said client terminal comprising:
    means to decode said encoded entities, making it possible to obtain a plurality of decoded entities;

means to compose said decoded entities, implemented at the times defined by said composition time stamps, wherein, for at least one of said encoded entities, said decoding means are activated prior to said composition time stamp, if a comparison between a current composition context and a composition context associated with said encoded entity is positive, indicating that the composition context associated with said encoded entity is identical to the current composition context.

15. Method comprising:

producing a signal representing a data flow intended to be reproduced by at least one reproduction device according to claim 10, said signal being available at the output of said decoding means and supplying said composition means of said device, wherein said signal comprises a plurality of entities of said flow, each comprising:

a composition time stamp;

an isdecod marker, specifying whether said entity was decoded in an anticipated manner;

and, when said isdecod marker takes a first value, said entity is in encoded form and, when said isdecod marker takes a second value, said entity is in decoded form and also comprises:

data items, referred to as presStruct, relating to a reproduction structure of said entity;

data items, referred to as decodInfo, relating to the decoding of said entity.

* * * * *